May 9, 1933. C. CANTÉ 1,908,114
ELECTRICAL HEATER FOR CIRCULATING WATER
Filed Feb. 19, 1931
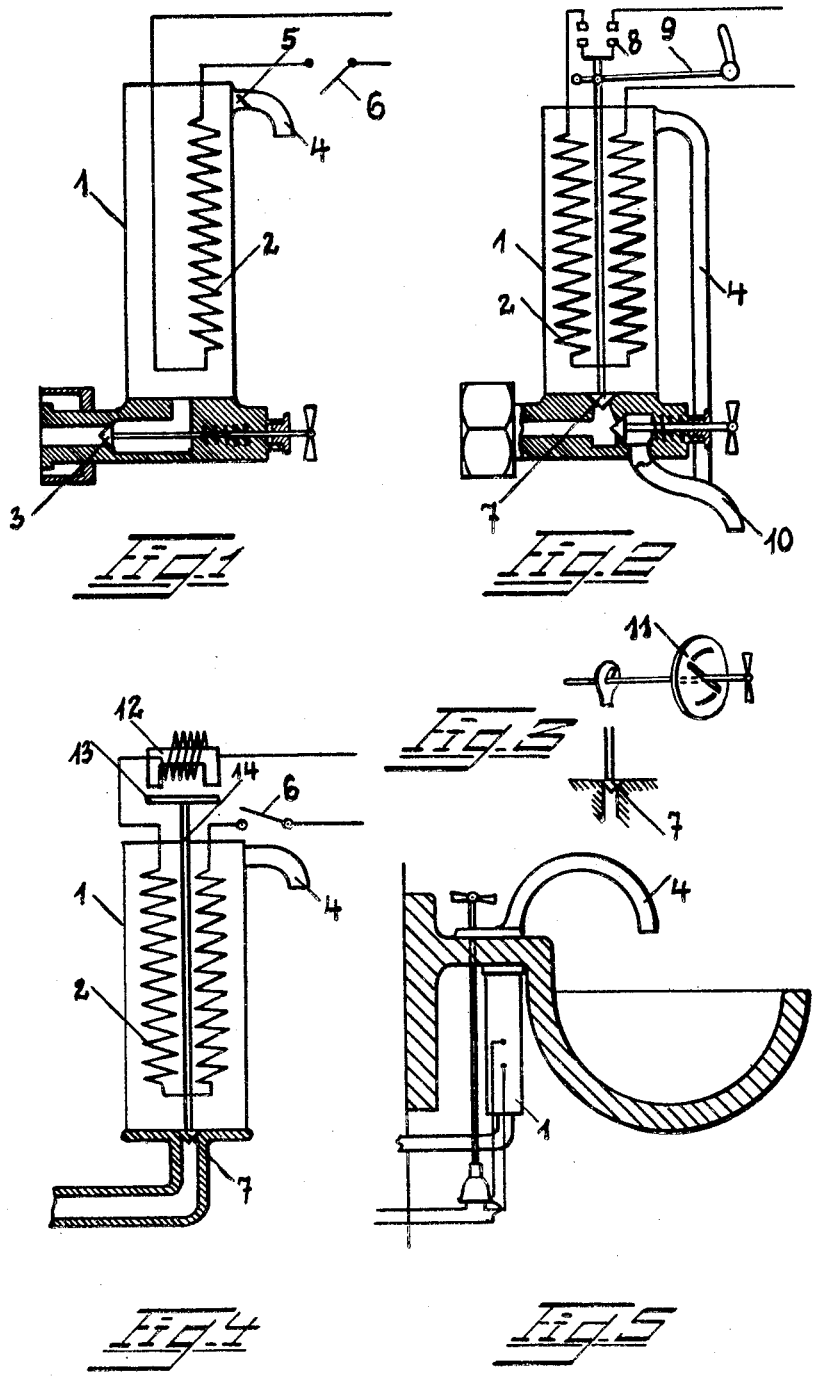
INVENTOR:
Cornelius Canté
By, Chatwin & Company Attys.

Patented May 9, 1933

1,908,114

UNITED STATES PATENT OFFICE

CORNELIUS CANTÉ, OF FRANKFORT-ON-THE-MAIN, GERMANY

ELECTRICAL HEATER FOR CIRCULATING WATER

Application filed February 19, 1931, Serial No. 516,987, and in Germany February 9, 1929.

The object of the present invention relates to a heating apparatus for electrically heating circulating or flowing water, the control of the current and water supply being conjointly and automatically effected.

A further novel feature consists therein that an acoustic signal is connected with the heater for flowing water which prevents the heater being damaged.

The drawing represents the object of the invention and in it Figure 1 is a diagrammatic view, partially in section of an electric heater for flowing water provided with a signalling device, Fig. 2 is a diagram according to Fig. 1 provided with a positive control of current and water. Figure 3 is a detail of Fig. 2. Fig. 4 is a diagrammatic view of such a heater for flowing water provided with an electro magnetic control of the current and water supply, and Fig. 5 is a diagrammatic view of an electric heater for circulating or flowing water arranged below the rinsing basin.

An electric heating element 2 of some known type is incorporated within a water container 1. The liquid for instance, water supply which may be effected from the bottom of a water container 1 is regulated by means of the valve 3. Above the top edge of the above mentioned electric heating element 2 the outlet pipe or socket 4 for the water heated in the container 1 is suitably mounted within said outlet or discharge pipe 4 an acoustic signal, for instance a whistle 5 or the like is suitably mounted. A switch 6 is arranged within the wires leading to the heating element 2.

In the case of the electric circulating water heater according to Fig. 2, a valve 7 is provided in the bottom of the water container 1, the said valve being positively connected with the electric switch 8 by means of a lever 9. By means of this arrangement the switching in of the electric current is effected simultaneously with the switching in of the water supply by mechanical means. The connection of the outlet of the heated water with the outlet or discharge pipe 4 is provided with a cock 10 similar to the arrangement on geysers. Instead of using a lever (tumbler) switch 8 for switching the electric current on a rotary switch 11 as shown in Fig. 3 may be used.

It is also possible to replace the mechanical interlocking of the water and electric current supply by an arrangement, whereby an electro magnet 12 is switched into the circuit of the heating element 2, which is arranged opposite an iron armature 13, arranged at the extremity of the valve rod 14. When the electric current is switched in by means of the switch 6 the electro magnet 12 is energized and attracts the armature 13. By reason of this the valve 7 is simultaneously opened, allowing the water to flow to the heating element. As there is always a certain amount of water present in the container 1 of this electric heater for circulating water supply, it is possible for the whistle or the like 5 to act as soon as the water supply has been cut off for some reason or other whilst the current is still on.

I claim:

1. An electric heater for circulating water comprising a water container, an electric heating member mounted within said water container, an electric circuit for supplying current to said heating member, a switch in said circuit, a water inlet to said container, said inlet being located in the bottom of said container, a valve for closing said water inlet, a discharge orifice to said water container, a whistle located in said orifice, said whistle being blown on the water valve and electric circuit being simultaneously closed.

2. An electric heater for flowing water comprising a water container, an electric heating element mounted within said water container, an electric circuit for supplying current to said heating element, a switch in said circuit, a water inlet to said container, said inlet being located in the bottom of said container, a valve for closing said water inlet, means for mechanically interlocking said switch and said water valve, a discharge spout to said water container, an alarm whistle located in said spout, said alarm whistle being blown on both the water inlet and circuit of the heating element being closed.

3. An electric heater for running water comprising a water container, an electric heating member mounted within said water container, an electric circuit for supplying current to said heating member, a switch for closing said circuit, a water inlet to said container, said inlet being located in the bottom of said container, a valve for closing said inlet, an electromagnet located in said electric circuit, an armature to said magnet, means connecting said armature with said water valve, a discharge spout to said water container, an alarm whistle located in said spout, said alarm whistle being blown on both the water inlet and electric circuit being closed.

4. An electric heater for running water comprising a water container, a wash basin, said water container being mounted below said wash basin, an electric heating member mounted within said water container, an electric circuit for supplying current to said heating member, a switch to said circuit, a water inlet to said water container, means for closing said inlet, a spout to said water container an independent supply of cold water to said spout, means for regulating said supply and a whistle located in said spout for sounding a signal, said signal being sounded on both water inlet and electric circuit being at the same time closed.

CORNELIUS CANTÉ.